(12) United States Patent
Narasayya et al.

(10) Patent No.: US 8,805,800 B2
(45) Date of Patent: Aug. 12, 2014

(54) GRANULAR AND WORKLOAD DRIVEN INDEX DEFRAGMENTATION

(75) Inventors: Vivek Narasayya, Redmond, WA (US); Manoj Syamala, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 477 days.

(21) Appl. No.: 12/723,683

(22) Filed: Mar. 14, 2010

(65) Prior Publication Data

US 2011/0225164 A1    Sep. 15, 2011

(51) Int. Cl.
*G06F 7/14*    (2006.01)
*G06F 17/30*   (2006.01)

(52) U.S. Cl.
CPC .... *G06F 17/30339* (2013.01); *G06F 17/30306* (2013.01); *G06F 2206/1004* (2013.01)
USPC ............ 707/693; 707/696; 707/741; 707/700

(58) Field of Classification Search
CPC ................... G06F 17/30339; G06F 17/30306; G06F 2206/1004
USPC ............. 707/999.1, 999.101, 999.2, 999.002, 707/693, 696, 700, 741
See application file for complete search history.

(56) References Cited

U.S. PATENT DOCUMENTS

| | | | |
|---|---|---|---|
| 4,774,657 A | 9/1988 | Anderson et al. | |
| 7,162,693 B2 | 1/2007 | Yamanaka et al. | |
| 7,444,338 B1 * | 10/2008 | Fisher | 1/1 |
| 2004/0034643 A1 * | 2/2004 | Bonner et al. | 707/100 |
| 2004/0205044 A1 | 10/2004 | Su et al. | |
| 2006/0206507 A1 * | 9/2006 | Dahbour | 707/100 |
| 2007/0192548 A1 | 8/2007 | Williams | |
| 2008/0228802 A1 * | 9/2008 | Marshall | 707/102 |
| 2009/0254594 A1 * | 10/2009 | Burchall | 707/205 |
| 2009/0265306 A1 * | 10/2009 | Barsness et al. | 707/2 |

OTHER PUBLICATIONS

"Defragmenting Indexes in SQL Server 2005 and 2008," Sheldon, Robert, Jul. 31, 2009, retrieved on Apr. 17, 2012 from http://www.simple-talk.com/sql/database-administration/defragmenting-indexes-in-sql-server-2005-and-2008/.*
"Index Fragmentation FAQ," by rekha, dated Mar. 25, 2008, retrieved from http://www.saptechies.com/faq-index-fragmentation.*
"IEEE 100 The Authoritative Dictionary of IEEE Standards Terms," IEEE Press, 2000, pp. 1 and 872.*
"Online Index Defragmentation", Retrieved at <<http://publib.boulder.ibm.com/infocenter/db2luw/v8/index.jsp?topic=/com.ibm.db2.udb.doc/admin/c0005495.htm>>, Apr. 30, 2009, p. 1.
Meier, et al., "How to Optimize SQL Indexes", Retrieved at <<http://www.guidanceshare.com/wiki/How_To_Optimize_SQL_Indexes>>, Dec. 18, 2007, pp. 7.

(Continued)

*Primary Examiner* — Bruce Moser
(74) *Attorney, Agent, or Firm* — Dan Choi; Carole Boelitz; Micky Minhas

(57) ABSTRACT

This patent application relates to granular and workload driven database index defragmentation techniques. These techniques allow for defragmenting individual index ranges, performing benefit analysis to estimate the impact of defragmenting indexes or index ranges, and leveraging such benefit analysis to provide automated workload-driven recommendations of index(es) or index range(s) to defragment.

22 Claims, 7 Drawing Sheets

(56) References Cited

OTHER PUBLICATIONS

Ufford, Michelle, "Index Defrag Script, v3.0", Retrieved at <<http://sqlfool.com/2009/06/index-defrag-script-v30/>>, Jun. 23, 2009, pp. 23.

"SQL Defrag Studio 2009", Retrieved at <<http://norbtechnologies.com/sql-defrag-studio-2009.aspx>>, 1999-2009, pp. 2.

Robidoux, Greg, "Managing SQL Server Database Fragmentation", Retrieved at <<http://www.mssqltips.com/tip.asp?tip=1165>>, Jan. 25, 2007, pp. 4.

Ozar, Brent, "Best Practices in Index Maintenance", Retrieved at <<http://i.zdnet.com/whitepapers/QUEST_BestPracticesIndexMaitenance_FightingSilentPerfKillers.pdf>>, 2008, pp. 12.

Cochran, W.; "Sampling Techniques", Third Edition; John Wiley & Sons; New York, NY; 1977; pp. 18-32.

Garey, M. et al.; Computers and Intractability. A Guide to the Theory of NP-Completeness; W.H. Freeman and Company; New York, NY; 1979; p. 65.

Aboulnaga, A. et al.; "Self-tuning Histograms: Building Histograms Without Looking at Data"; Proceedings of the 1999 ACM SIGMOD International Conference on Management of Data; Jun. 1999; pp. 181-192; ACM; New York, NY.

Agrawal, S. et al.; "Database Tuning Advisor for Microsoft SQL Server 2005"; Proceedings of the 2005 ACM SIGMOD international conference on Management of data; pp. 1110-1121; ACM, New York, NY.

Antoshenkov, G.; "Random Sampling from Pseudo-Ranked B+ Trees"; Proceedings of the $18^{th}$ International Conference on Very Large Data Bases; pp. 375-382; Morgan Kaufmann Publishers Inc.; San Francisco, CA.

Aoki, P.; "Generalizing 'Search' in Generalized Search Tree"; $14^{th}$ International Conference on Data Engineering; Feb. 23-27, 1998; pp. 380-389.

Chaudhuri, S. et al.; "Random Sampling for Histogram Construction: How much is enough?"; Proceedings of the 1998 ACM SIGMOD International Conference on Management of Data; pp. 436-447; ACM; New York, NY.

Chaudhuri, S. et al.; "Automating Statistics Management for Query Optimizers"; IEEE Transactions on Knowledge and Data Engineering; Jan.-Feb. 2001; vol. 13, Issue 1; pp. 7-20.

Dageville, B., et al.; "Automatic SQL Tuning in Oracle 10g"; Proceedings of the $30^{th}$ International Conference on Very Large Data Bases; vol. 30; 2004; pp. 1098-1109.

El-Helw, A. et al.; "Collecting and Maintaining Just-in-Time Statistics"; Proceedings of ICDE '07; Istanbul, Turkey; 2007; pp. 516-525.

Narasayya, V.R. et al.; "Workload Driven Index Defragmentation"; Proceedings of the $26^{th}$ International Conference on Data Engineering; Mar. 1-6, 2010; Long Beach, CA; pp. 497-508.

Ruthruff, M; "Microsoft SQL Server 2000 Index Defragmentation Best Practices"; Feb. 2003; Microsoft TechNet.

Stillger, M. et al.; "LEO—DB2's Learning Optimizer"; Proceedings of the $27^{th}$ International Conference on Very Large Data Bases; 2001; pp. 19-28; Morgan Kaufmann Publishers Inc.; San Francisco, CA.

Zilio, D.C. et al.; "DB2 Design Advisor: Integrated Automatic Physical Database Design"; Proceedings of the $30^{th}$ International Conference on Very Large Data Bases; vol. 30, 2004; pp. 1087-1097.

* cited by examiner

GRANULAR AND WORKLOAD DRIVEN INDEX DEFRAGMENTATION

BACKGROUND

Fragmentation of data base indexes can have a significant impact on input/output (I/O) costs associated with responding to database queries. For example, an index can be externally fragmented when the logical order of the index's pages is different than the physical order that the pages are stored on disc. Alternatively or additionally, indexes can be internally fragmented when the storage capacity of individual index pages is not fully utilized. As a result of the index being internally fragmented, more index pages might be used to store data (e.g., records) than would otherwise be necessary if the index were not internally fragmented As a result of the index being externally fragmented, more I/O operations might be performed to respond to a query than would otherwise be performed if the index were not internally fragmented.

Defragmenting indexes, however, can also involve significant I/O costs. As such, database administers typically employ defragmenting operations judiciously. Unfortunately, the number of defragmentation options and tools currently available to database managers are limited. For example, entire indexes typically need to be defragmented, which can be costly. Furthermore, database managers are typically limited to relying on rules of thumb based on index size and fragmentation statistics when trying to determine which index(es) of a database to defragment. This data-driven type of approach, however, can lead to the defragmentation of indexes that have little or no impact on the performance of queries or other search statements on the database.

SUMMARY

Granular and workload driven index defragmentation techniques are described. These techniques allow for defragmenting individual index ranges, performing benefit analyses to estimate the impact of defragmenting indexes or index ranges, and leveraging such benefit analyses to provide automated workload-driven defragmentation recommendations. For example, benefit analyses can be used to provide defragmentation recommendations for a given workload of individual statements and for a given available defragmentation budget.

In some embodiments, one or more logical ranges of an index of a database (i.e. index ranges), rather than the entire index, can be defragmented. For the purposes of this discussion, a logical range of an index can be thought of as a range of that index that is specified by a search argument (e.g., of a statement such as a query) that limits a search of that index by specifying an exact match (e.g., between query terms), a range of values, and/or two or more items joined by an AND operator. In other words, a logical range of an index (i.e. index range) can be a range predicate on the leading column of the index. This range-level index defragmentation can include identifying an index range to be defragmented. An offset for the index range can then be computed. The offset can designate where the first page of a defragmented version of the index range is to be placed in the index. The index range can then be defragmented (without defragmenting the entire index) in accordance with the offset by removing internal and/or external fragmentation of the index range.

In some embodiments, a benefit analysis for defragmenting a an index or index range(s) of interest can be performed. The benefit analysis can include estimating the impact that defragmenting the index or index range(s) would have without actually defragmenting the index or index range(s). For example, in some embodiments, the benefit analysis can provide a quantified estimate of the impact, in terms of resources (e.g., number of I/O operations) for executing a statement, that defragmenting the particular index or index range(s) would have.

In some embodiments, benefit analyses can be leveraged to provide recommendations of which index(es) or index range(s) of the database to defragment for a given workload of individual statements and for a given defragmentation budget. In some embodiments, candidates to potentially be defragmented can be automatically identified and a benefit analysis can then be automatically performed for individual candidates to estimate benefits of defragmenting the individual candidates. Based on the given workload, defragmentation, and/or estimated benefits, one or more of the candidates can be automatically selected and/or recommended for defragmentation.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements.

DETAILED DESCRIPTION

Overview

Figure 1:
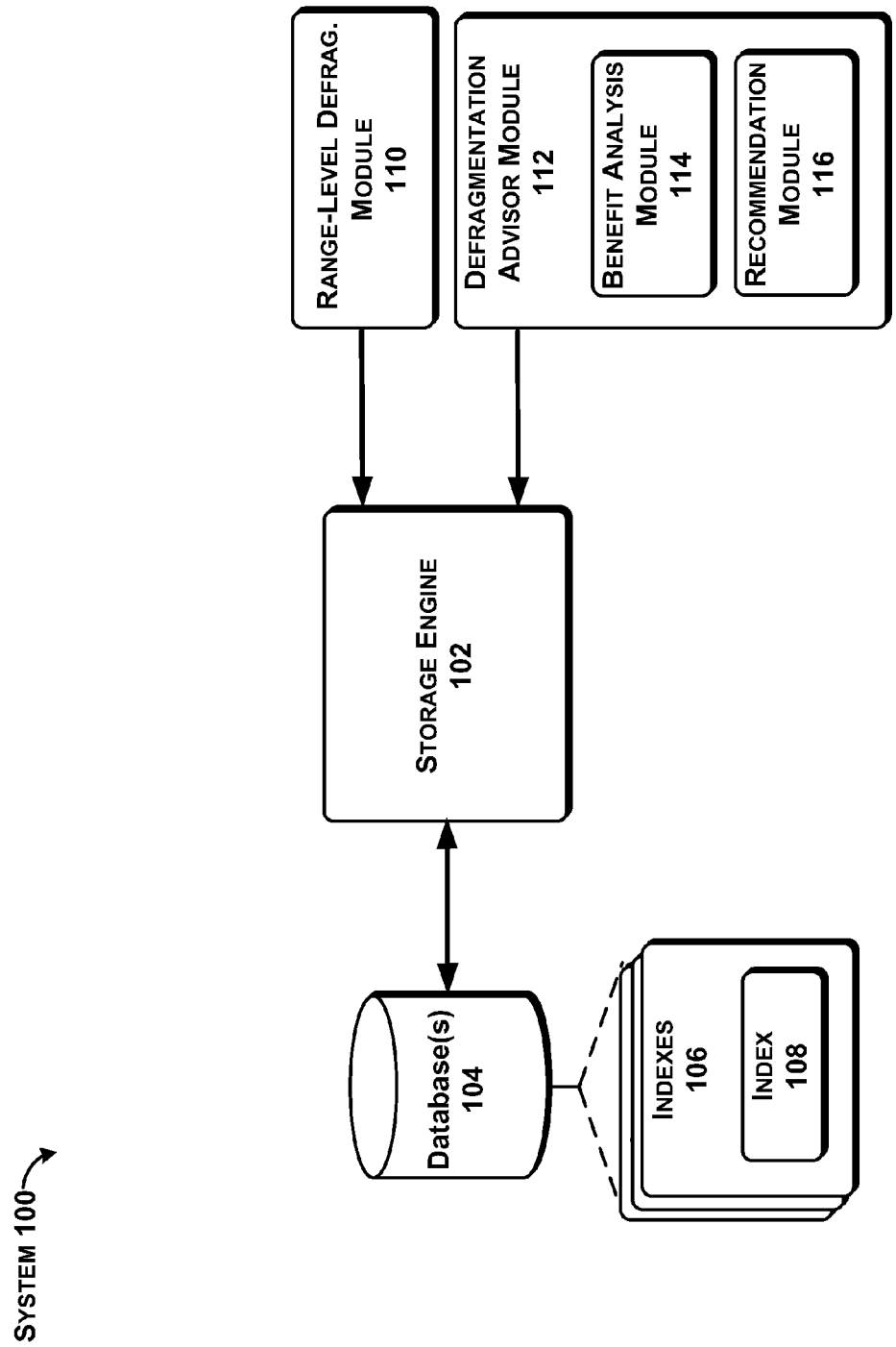
FIG. 1 illustrates an example system in which the described defragmentation techniques can be implemented, in accordance with some embodiments.

This patent application relates to granular and workload driven index defragmentation techniques. These techniques allow for defragmenting individual index ranges, performing benefit analyses to estimate the impact of defragmenting indexes or index ranges, and leveraging such benefit analyses to provide automated workload-driven defragmentation recommendations. These techniques can be utilized by a user, such as a data administrator for example, to more efficiently and effectively utilize available defragmentation resources.

In some embodiments, one or more logical ranges of an index of a database (i.e. index ranges), rather than the entire index, can be defragmented. This range-level index defragmentation can include identifying an index range to be defragmented. The index range might be expressly identified in a communication, identified as a range that would be scanned in the event a statement were executed over the index, etc. An offset for placing a defragmented version of the index range in the index can then be computed. For example, as described in further detail below, in some embodiments the offset may be computed by estimating what the size of another adjacent index range in the range would be in the event the entire index was defragmented. The offset can designate where the first page of the defragmented version of the index range is to be placed in the index. The index range can then be defragmented in accordance with the offset. More particularly, the index range can be defragmented and placed at an appropriate position in the index.

In some embodiments, a benefit analysis for defragmenting an index or index range(s) of interest can be performed. The benefit analysis can include estimating or predicting the impact that defragmenting the index or index range(s) would have on execution of a statement. The benefit analysis can be accomplished without defragmenting the index and without executing the statement. More particularly, in some embodiments a first number of estimated resources for executing the statement over the index or index range(s) can be computed. A second number of estimated resources for executing the statement over a defragmented version of the index or index range(s) can also be computed. The first and second number of estimated resources can then be compared to quantifiably estimate the impact that would result from defragmenting the index or index range(s).

In some embodiments, benefit analyses can be leveraged to provide automated recommendations of which index(es) or index range(s) (if any) of a database to defragment. The recommendations can be based on a given workload that includes one or more statements and corresponding weights (e.g., frequency) for each statement. The recommendations can also be based on a given defragmentation budget that includes a resource limit (e.g., measured in I/O cost units) for defragmenting individual indexes and/or index ranges of the database.

For example, in some embodiments. a workload and a defragmentation budget can be received. Target index(es) or index range(s) that would be scanned as a result of the statement(s) of the workload being executed can then be identified as candidates to potentially be defragmented. Optionally, additional candidates may also be identified based on fragmentation statistics, index and/or index range characteristics, and/or other data associated with the database. Benefit analyses can then be performed to estimate benefits of defragmenting individual candidates. The benefit analyses can be performed without executing any of the statement(s) and without defragmenting any of the candidates. Based on the workload, the defragmentation budget, and/or each candidate's estimated benefit (i.e., the estimated benefits), a set of the candidates can be selected and/or recommended for defragmentation. The set of recommended candidates can include any number of the candidates (i.e., zero recommended candidates, one recommended candidate, or multiple recommended candidates). In some embodiments, the selection can be accomplished by utilizing a greedy heuristic.

Multiple and varied implementations are described below. Generally, any of the features/functions described with reference to the figures can be implemented using software, hardware, firmware (e.g., fixed logic circuitry), manual processing, or any combination thereof.

The term, "module" or "component" as used herein generally represents software, hardware, firmware, or any combination thereof. For instance, the term" "module" or "component" can represent software code and/or other types of instructions that perform specified tasks when executed on a computing device or devices.

Generally, the illustrated separation of modules, components, and functionality into distinct units may reflect an actual physical grouping and allocation of such software, firmware, and/or hardware. Alternatively or additionally, this illustrated separation can correspond to a conceptual allocation of different tasks to the software, firmware, and/or hardware. Furthermore, it is to be appreciated and understood that the illustrated modules, components, and functionality described herein can be located at a single site (e.g., as implemented by a computing device), or can be distributed over multiple locations (e.g., as implemented over multiple computing devices).

Example System

FIG. 1 illustrates an example system, generally at 100, in which the described defragmenting techniques can be implemented. In some embodiments, all or part of a system may comprise a database management system (DBMS), such as a relational DBMS for example. In this example, system 100 includes a storage engine 102 configured to access and manage data in one or more database(s) 104. For example, storage engine 102 may create, update, retrieve, and/or delete data in/from database(s) 104. Storage engine 102 may also be configured to receive and process executable statements (e.g., queries, update statements, etc.) directed to the database(s) and, in response, access database(s) 104 according to the statements. For example, storage engine 102 may receive a query (e.g., a search query language (SQL) query) of database(s) 104 and, in response, process the query. Processing the query may include executing the query over one or more database structures and/or retrieving data from database(s) 104 in accordance with the query to be provided in a response.

To support creating, retrieving, updating, and/or deleting data in database(s) 104, the database(s) can include various types of data structures, including one or more indexes 106 for example. Generally speaking, indexes 106 can facilitate or speed up the storage engine's access of data in database(s) 104. For example, a statement (e.g., query) received by storage engine 102 may be executed over one or more individual example indexes of indexes 106, and/or over one or more index ranges of the individual index(es). Indexes 106 can include any number of individual indexes. For purposes of discussion, one example index of indexes 106, namely index 108, will be referred to and further described below.

To facilitate the access of data in database(s) 104, system 100 also includes a range-level defragmentation module 110 and a defragmentation advisor module 112. As described in further detail below, these modules may be utilized by a user (e.g., a data administrator) to more efficiently and effectively defragment indexes 106, such as index 108 for instance. More particularly, range-level defragmentation module 110 can be configured to allow for one or more individual ranges (i.e. index ranges) of index 108, rather than all of index 108, to be defragmented. Such range-level defragmentation is described in further detail below.

Defragmentation advisor module 112, in turn, includes a benefit analysis module 114 and a recommendation module 116. Benefit analysis module 114 can be configured to perform a benefit analysis for defragmenting a data structure of database(s) 104. For example, and more particularly, benefit analysis module 114 can be configured to perform a benefit analysis for defragmenting index 108 and/or an index range(s) of index 108.

The benefit analysis can provide an estimate of the difference (in resources) for executing a statement over a defragmented version of index 108 or the index range(s) as compared to executing the statement(s) over a fragmented version of the index or the index range(s). In other words, a prediction of the impact that defragmenting index 108 or the index range(s) would have on executing the statement(s) can be provided by the benefit analysis.

As explained in detail further below, benefit analysis module 114 can perform the benefit analysis without indexes 106 being defragmented and without the statement(s) being executed. In some embodiments, functionality to perform the benefit analysis can made be available (e.g., to the user, another module, etc.) via an application program interface (API) of benefit analysis module 114.

In some embodiments, benefit analysis module 114 can be configured to automatically aggregate and store the results of various benefit analyses performed. For example, benefit analysis module 114 may automatically monitor for statements and, responsive to detecting a statement, perform a benefit analysis for the monitored statement. For example, the benefit analysis can provide a quantified estimate of the impact, in terms of resources (e.g., number of I/O operations) for executing the monitored statement, that defragmenting a particular index or index range would have. The results of the benefit analysis (e.g., estimated impact information) can then be stored with results of other benefit analyses in a data table or other accessible location. In some embodiments, the stored results may also be made available via an API of benefit analysis module 114.

Recommendation module 116 can be configured to automatically provide recommendations of which index(es) or index range(s) of indexes 106 (if any) to defragment for a given workload and for a given defragmentation budget. To accomplish this, recommendation module 116 may leverage a benefit analysis performed by, for example, benefit analysis module 114. Alternatively or additionally, recommendation module 116 may be configured to perform all or part of the benefit analysis. The operations of recommendation module 116 are described in detail further below.

System 100 can include any number of additional modules, components, or functionalities to support storage engine 102 accessing and managing database(s) 104. For example, storage engine 102 may include other defragmenting-related modules configured to perform defragmenting operations on indexes 106 in coordination with range-level defragmentation module 110 and/or defragmentation advisor module 112. For the sake of readability, such modules, components, and/or functionalities are not illustrated or described here.

Figure 2:
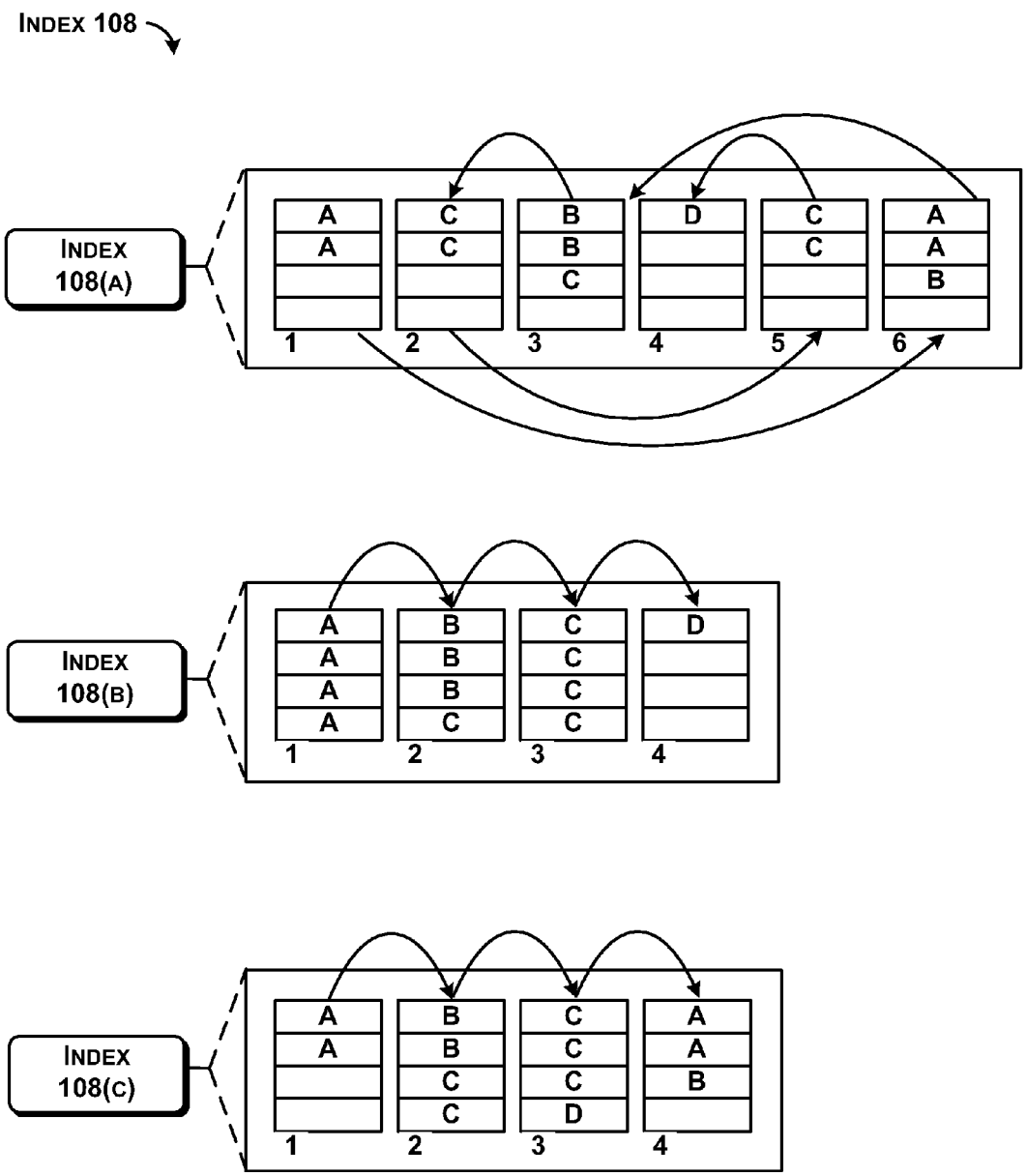
FIGS. 2 and 3 illustrate example database indexes, in accordance with some embodiments.

To assist the reader in understanding the described defragmentation techniques, an overview of some basic features associated with index fragmentation and defragmentation will first be provided in the context of FIG. 2. In this regard, FIG. 2 illustrates further details of example index 108 in the context of three versions of index 108, namely 108(a), 108(b), and 108(c). While like numerals from FIG. 1 have been utilized to depict like components, index 108 represents but one example of an index and is thus not to be interpreted as limiting the scope of the claimed subject matter.

Index Structures:

databases (e.g., database 104) typically support index structures (e.g., indexes 106) for speeding up access to data. An index can be defined by a sequence of columns on a given table or materialized view. In general, when an index of a database is partitioned, each partition of the index can be stored on disk as an individual B+ Tree. For the sake of clarity, in this discussion an index will be referred to herein in the context of having one partition and thus one B+ Tree. The terms "B+ Tree" and "index" may be used interchangeably in this discussion. It is to be understood, however, that the described defragmentation techniques are equally applicable to indexes that have been partitioned into multiple partitions as well.

Index structures (i.e., B+ Tree structures) can include individual leaf pages for storing data (e.g., records). Each leaf page may include a number of records and pointers to the next leaf page(s) in the logical order of keys in the index. This can make range queries that scan the index more efficient. Index structures can also include individual non-leaf pages which may include pointers to one or more other non-leaf pages and/or one or more leaf pages. Non-leaf pages may be accessed to locate individual leaf pages.

As a practical example of an index, consider a first version of index 108, generally at index 108(a). For the sake of simplicity, index version 108(a) is shown as having six leaf pages designated by their respective page identifiers: 1-6. Note that each leaf page is shown as having a maximum capacity of four data rows. Also note that leaf pages 1-6 are shown as a singly linked list with leaf pages being physically ordered 1, 2, 3, 4, 5, 6. Also note that each leaf page is shown with a pointer linking that leaf page to another leaf page to establish a logical order of the leaf pages, as described in more detail below. In this example, key data associated with four entities (A, B, C, and D) is shown as being stored in various data rows of the leaf pages. For example, leaf page 1 includes two data rows with key data for A and two empty data rows. As explained below, index version 108(a) can thus be considered a fragmented version of index 108.

Index Fragmentation:

Typically when an index is built, there is little or no fragmentation. Over time however, as data is inserted, deleted and updated, index fragmentation can increase due to leaf page splits. As noted above, index defragmentation can include internal and external defragmentation.

Internal index fragmentation can occur when leaf pages of an index are not filled to their storage capacity and my thus have unused space that could be used. The storage capacity might be specified by a user or be a default limit (e.g. 0.85 or 85%). For the sake of simplicity, in this example, indexes will be described in the context of having a maximum fill limit of 1.0 or 100%. However, it is to be understood that the described defragmentation techniques are applicable to indexes having any maximum fill limit.

As a practical example of internal index fragmentation, again consider index version 108(a) in FIG. 2. Note that index version 108(a) is internally fragmented since it includes leaf pages that have unused space. More particularly, here each of leaf pages 1-6 are internally fragmented since each leaf has a maximum fill of 1.0 but has data rows that are not filled with key data.

External index fragmentation can occur when the physical order of the leaf pages and the logical order of the leaf pages is not the same. This can happen, for example, when new key data is inserted into a leaf page that does not have sufficient space. In such a scenario, to accommodate the new key data, existing key data in the leaf page may be moved to another leaf page, such as a newly created leaf page for instance. This can cause a B+ tree split which leads to leaf pages of the index becoming logically disordered.

As a practical example of external index fragmentation, again consider index version 108(a). Unlike index version 108(b) (described in more detail below) which can be considered a defragmented version of index 108, index version 108(a) can be considered a fragmented version of index 108. As noted above, the physical order of the leaf pages is 1, 2, 3, 4, 5, 6. The logical order of the leaf pages, on the other hand, is the logical order of how the key data is stored and can be obtained by following the pointers shown in FIG. 2: 1, 6, 3, 2, 5, 4. Since the physical order (1, 2, 3, 4, 5, 6) and logical order (1, 6, 3, 2, 5, 4) of the leaf pages are not the same, index version 108(a) is externally fragmented.

Index Defragmentation:

Two commonly used index defragmenting approaches are performing an index rebuilding operation or performing an index reorganization operation. An index rebuilding operation can be similar to creating an index and thus can involve fully scanning and sorting rows on which an index is defined. Individual leaf pages of the index can be allocated, written out on disc, and then filled so that there is little or no internal fragmentation. In addition, individual leaf pages can be written to file sequentially in logical order such that there is little or no external fragmentation.

An index reorganizing operation, on the other hand, can be implemented as an in-place operation that may not require additional storage space. In at least some embodiments, a reorganizing operation can include two phases. In a first compaction phase, internal fragmentation can be removed by moving rows across leaf pages. For example, in the context of index version 108(*a*), two rows of leaf page 6 holding key data for entity A might be moved to leaf page 1 during the compaction step. In this way, the number of leaf pages in the index can be reduced in this step. In a second swap phase, leaf pages remaining after the compaction step can then be reordered via a series of page swaps so that the logical order of leaf pages in the index is the same as (or very close to) the physical order of leaf pages in the data file.

Rebuilding or reorganizing operations can both involve significant I/O costs. For discussion purposes, the index defragmentation techniques herein will be described in the context of performing index reorganizing operations. However, it is to be understood that many of these techniques (e.g., performing a benefit analysis and providing automated workload-driven recommendations) are also applicable in the context of performing index rebuilding operations as well.

As a practical example of an entire defragmented index, now consider index version 108(*b*) in FIG. 2. Here, index version 108(*b*) has been fully defragmented by a defragmentation operation, such as a reorganizing operation for example. As such, index version 108(*b*) can be considered a defragmented version of index 108. More particularly, note that index version 108(*b*) does not include any leaf pages with unused space that could be used by remaining key data.

Note that by virtue of being defragmented, fewer leaf pages are necessary to store the same number of data keys in defragmented version 108(*b*) as compared to fragmented version 108(*a*). As a result, fewer I/Os are necessary to respond to a query or other statement executed over index version 108(*b*). However, as noted above, defragmenting operations (e.g., reorganizing operations) can involve significant I/O costs. In this regard, the cost of executing a reorganizing operation on an index can depend on the extent or measure of internal fragmentation and external fragmentation in the index, and on the number of leaf pages reorganized or defragmented in the index. Consider, for example, the following models for measuring the extent of internal index defragmentation (e.g., the index compaction ration), external fragmentation, and reorganization cost associated with index defragmentation.

Compaction Ratio Model:

An example compaction ratio model can be considered for measuring internal index fragmentation. More particularly, the model can incorporate a compaction ratio, denoted CR(I), for an index I as the number of pages in I after defragmenting I to the total number of pages in I, denoted as $N_I$, before being defragmented. Note that $0 < CR(I) \leq 1$. $CR(I)=1$ implies that I has no internal fragmentation, whereas a value close to 0 implies I has a large amount of internal fragmentation. Also note that, in the context of CR(I), the compaction ratio can be expressed as:

$$CR(I) = \frac{N_{Reorg(I)}}{N_I}$$

External Fragmentation Model:

The measure of external fragmentation of an index I can be denoted EF(I). In this regard, EF(I) can be considered the ratio of the number of fragments (non-contiguous leaf page sequences) in I to the total number of pages in the index.

Cost Model:

ReorgCost(I) can denote the I/O cost of executing a reorganizing operation Reorg(I) to defragment index I as determined by the cost model. The cost model can be used to help differentiate (i.e. compare) defragmentation costs across different indexes of a database. In this regard, the cost model can be expressed using the following formula:

$$ReorgCost(I) = k_1 N_I + k_2 N_I (1 - CR(I)) + k_3 CR(I) N_I EF(I)$$

In the above formula, $k_1$, $k_2$, and $k_3$ can be constants set by calibrating the cost model to a particular system (e.g., Microsoft SQL Server brand by Microsoft Corporation of Redmond, Wash. U.S.A). Recall that the total number of pages in I can be denoted as $N_I$. Also, note that the first two terms ($k_1 N_I + k_2 N_I (1-CR(I))$) in the above formula represent a cost of removing internal fragmentation in I. This can involve scanning leaf pages of index I to detect an amount of internal fragmentation, moving rows of index I to fill pages, and removing unused pages of index I.

The final term ($k_3 CR(I) N_I EF(I)$) in the above represents the cost of removing external fragmentation. This final term works on $CR(I) \times N_I$ pages, since this is the number of pages remaining after internal fragmentation is removed. The cost of this step can depend on the degree of external fragmentation EF(I).

Range-Level Defragmentation

As can be seen from the above cost model, the I/O cost of defragmenting operations such as Reorg(I) can depend on the number of index pages to be processed. As such, defragmenting one or more ranges of an index (i.e., range-level defragmentation), rather than the entire index, can be a more efficient approach to defragmenting.

As a practical example of range-level defragmentation, now consider index version 108(*c*). Index version 108(*c*) illustrates an example in which a logical range of index 108, rather than all of index 108, has been defragmented. More particularly, here a logical range r that includes key data between entities C and D has been defragmented. Note that logical ranges of index version 108(*c*) other than range r (e.g., col BETWEEN 'A' AND 'B') have not been defragmented.

Recall that for the purposes of this discussion, a logical range of an index (i.e. index range) can be thought of as a range predicate on the leading column of the index. As such, in the example above regarding index 108(*c*), the logical index range r may have been specified as "col BETWEEN 'C' AND 'D'", where col is the leading column of index 108(*c*). As another example, consider an index with the leading column OrderDate. A logical index range may, for instance, be specified as "06-30-2009≤OrderDate≤09-30-2009".

There are at least two reasons why range-level defragmentation, such as shown with index version 108(*c*) for example, can be advantageous with respect to more efficiently defragmenting an index. First, fragmentation may not be uniform across an entire index. In this regard, updates are often skewed towards certain ranges of the index as compared to the other ranges. This can cause one or more particular ranges of the index to have a relatively high amount of fragmentation.

In such cases, defragmenting these highly defragmented range(s), rather than all the ranges of the index, may be sufficient with respect to improving I/O performance.

Second, a majority of queries or other statements on the index may be directed or targeted to accessing one or more targeted ranges of the index. In such cases, defragmenting these more commonly targeted range(s), rather than all the ranges of the index, may be sufficient with respect to improving I/O performance through performing a defragmentation operation.

For example, it may not be necessary to defragment index ranges that are only moderately fragmented (i.e., not highly defragmented) and/or that are not commonly targeted by statements, to achieve an I/O performance benefit that is the same or similar to a benefit that would be achieved by defragmenting the entire index. As such, range-level defragmentation can provide a more efficient way of defragmenting an index because similar defragmenting benefits can be achieved by defragmenting highly fragmented and/or more commonly targeted index ranges with less I/O defragmentation costs than would otherwise be incurred by defragmenting the entire index.

As noted above, in the context of system 100, range-level defragmentation module 110 can be utilized to perform range-level defragmentation. For example, in the context of index 108, a logical index range $r_1$ (of index 108) to be defragmented may be identified. Without limitation, $r_1$ might be identified in a communication (e.g., from the user) expressly specifying $r_1$, identified as a range that would be scanned by a statement if the statement were to be executed, or the like. Range-level defragmentation module 110 can then compute an offset for placing a defragmented version of $r_1$ in index 108. The offset can designate where the first page of $r_1$ is to be placed in index 108 after $r_1$ has been defragmented.

In this regard, the offset can be computed in such a way that future defragmentation of at least one other logical index of index 108, such as an index range $r_2$ for instance, will not undermine the I/O benefits achieved by defragmenting $r_1$. For example, assume $r_2$ is a non-overlapping prefix range of $r_1$ such that $r_1$ and $r_2$ are logically and physically contiguous adjacent ranges. If the defragmented version of $r_1$ was simply placed at a default offset of 0, or at the same position as $r_1$ prior to being defragmented, then the defragmentation of $r_2$ would likely cause $r_1$ and $r_2$ to become physically separated, and thus not adjacent. This is because at least some pages of $r_1$ would likely be swapped to different locations when the defragmented version of $r_2$ is placed in index 108. As a result, external fragmentation of index 108 would likely occur, thus undermining the I/O benefits achieved by the defragmentation of $r_1$.

In operation, range-level defragmentation module 110 can compute the offset by estimating what the size of $r_2$ would be in the event the entire index 108 was defragmented. For example, in some embodiments the number of pages that $r_2$ would include in a fully defragmented version of index 108 can be estimated. Range-level defragmentation module 110 can perform the estimate without having to defragment index 108 (including $r_1$ or $r_2$) and without having to access each page of $r_2$. For example, as will be described in more detail further below, in some embodiments the estimate may be performed by randomly sampling a portion of the pages of $r_2$ (i.e., less than all of $r_2$'s pages), computing a page fullness of each randomly sampled page, and then scaling up the results of the computing.

Once the offset is computed, $r_1$ can then be defragmented in accordance with the offset by removing internal and/or external fragmentation of $r_1$. In this regard, $r_1$ can be defragmented without defragmenting any other logical index range of 108, and thus without having to defragment all of index 108. Note that by placing the defragmented version of $r_1$ at the offset, the future defragmentation of $r_2$ will not undermine the benefits achieved by $r_1$'s defragmentation. Note that for the sake of simplicity, the above example was described in the context of $r_1$ being a single logical index range of index 108. However, it is to be understood that the techniques described in the above example may also be applied to a set of multiple ranges to be defragmented.

To assist the reader in understanding the described range-level defragmentation techniques, certain desirable range-level defragmentation properties will first be described. Recall from above that defragmenting one or more ranges of an index can be more efficient than defragmenting the entire (e.g., whole) range. To provide such an efficient result, it can be desirable for a range-level defragmenting operation to have certain properties. For example, as a result of defragmenting the index range(s), more I/Os should not be necessary for executing a statement over the index after the one or more ranges have been defragmented than would be necessary had the entire index been defragmented. As another example, results of defragmenting the index range(s) should not be undone by a subsequent defragmenting operation. As yet another example, defragmenting the range(s) should not require more work (i.e., a greater I/O cost) than defragmenting the entire index.

In some embodiments, the above properties may be expressed as equivalence, stability, and efficiency requirements. Furthermore, these requirements may be imposed on range-level defragmentation operations. Each of these requirements will be described in detail below in the context of an example query that scans a logical range r for index I. In this regard, NumIOs(r,I) may be used to denote the number of I/Os required for the range scan r on index I.

Equivalence:

The number of I/Os required for a query that scans exactly the defragmented range should be the same as though the full index, or B+ Tree, were defragmented. This requirement can ensure that range-level defragmentation does not compromise I/O performance when compared to defragmenting the entire index. Using the notation above, the equivalence requirement can be expressed as:
NumIOs(r, Reorg(I, {r})=NumIOs(r, Reorg(I)), wherein NumIOs(r, Reorg(I, {r}) is the number of I/O's required for a range scan r of I when one or more ranges {r} of I are defragmented using a reorganization operation, and NumIOs (r, Reorg(I)) is the number of I/O's required for a range scan r of I (using a reorganization operation) when the entire index I is defragmented using a reorganization operation.

Stability:

For a first index range(s) already defragmented, defragmenting other index ranges (e.g., in the same index) should not undo or otherwise interfere with any performance benefits from defragmenting the first index range(s). For example, assume index range $r_1$ is defragmented and the number of I/Os required for a query that scans $r_1$ is $n_1$. Furthermore, assume index range $r_2$ is then defragmented. The number of I/Os required for a query that scans $r_1$ should remain $n_1$. Formalistically, this stability requirement can be defined as:

$$\forall r_1, r_2 : \text{NumIOs}(r_1, \text{Reorg}(I, \{r_1\})) = \text{NumIOs}(r_1, \text{Reorg}(I_1, \{r_2\}) \text{ where } I_1 = \text{Reorg}(I, \{r_1\}), \text{ where } \forall \text{ indicates for all ranges } r_1, r_2.$$

Efficiency:

Work done by a range-level operation to defragment an index range(s) should be proportional to the number of pages in the index range. As an example, consider a partitioning of the index into two logical index ranges. Ideally, the sum of the cost of invoking the range-defragmentation method on two logical index ranges should not cost significantly more than the cost of defragmenting the full index in a single invocation.

Having described the example range-level defragmentation requirements above, example range level defragmentation operations that satisfy these requirements are described in detail below. In some embodiments, a module, such as range-level defragmentation module 110, can be configured to perform these defragmentation operations.

Two key decisions may influence a range-level defragmentation: (i) how the fragmentation of pages in an index range(s) $r_1$ is removed, and (ii) the offset (which can be measured in number of pages) at which the first page of $r_1$ (after being defragmented) is to be placed. Note that the remaining pages of $r_1$ after defragmentation are to be placed contiguously following the first page.

First, the equivalence and efficiency requirements described above can be used to determine decision (i). More particularly, a reorganizing operation can be utilized to remove internal and external fragmentation in $r_1$. Thus the remaining decision is (ii), to determine the offset (in number of pages) from the first page of the index where the first page of $r_1$ is to be placed after $r_1$ is defragmented. In this regard, the stability requirement described above can be used to make this determination.

The task of determining offset can be considered non-trivial. Consider the following example of a range-level index defragmentation scheme that does not satisfy the stability requirement described above. For purposes of discussion, such as scheme may be referred to as a non-satisfactory scheme. In this example, the non-satisfactory scheme may set the offset to 0 regardless of the specified range $r_1$ of the index I. In other words, the non-satisfactory scheme may place pages of $r_1$ starting at the beginning of I. While this non-satisfactory scheme might satisfy the equivalence and efficiency requirements described above, it is unlikely that the stability requirement can be satisfied. For example, when another non-overlapping index rage $r_2$ is then defragmented, the pages of $r_2$ will likely be placed at offset 0. Thus, pages in $r_1$ may be swapped to different locations in the file, and therefore $r_1$ may become fragmented once again. In turn, this will increase the number of I/Os for any query that scans $r_1$, thereby violating the stability requirement.

With respect to determining the offset, in some embodiments the following example lemma can be used to compute the offset. In this regard, p(r) can denote the prefix range of a range r (e.g., a logical range between a first key in I and a key just preceding the first key in index range r). For example, in the context of index 108(c) of FIG. 2, if r is considered the logical range ['C','D'], then p(r) may be considered the range ['A','B']. Similarly, let s(r) denote the suffix of range r.

Example Lemma 1:

(offset): for a range level index defragmentation scheme that satisfies the equivalence, efficiency, and stability requirements, when defragmenting r on index I, the scheme may use an offset equal to the number of pages in p(r) in the fully defragmented index I.

As noted above, example lemma 1 (offset) may be used to compute the offset for r as the number of pages in p(r) in the fully defragmented index. One challenge of computing the offset is to compute the offset efficiently. More particularly, it may be challenging to compute the offset accurately without having to defragment the entire index I. To accomplish this, a type of "what if" analysis can be performed to estimate what the impact of defragmenting I would be with respect to the number of pages in p(r) in the event I were to be fully defragmented.

To illustrate this challenge, let the number of pages in p(r) in the current index I be $N_c$ and the number of pages in p(r) in the fully defragmented index be $N_d$. Thus $N_d$ represents the number of pages in p(r) in the event I were to be fully defragmented. Note that $N_d \leq N_c$ and that the reduction (if any) in the number of pages from $N_c$ to $N_d$ is due to internal fragmentation of the pages in p(r). Thus:

$$N_d = N_c \times CR(p(r))$$

where CR(p(r)) is the compaction ratio of p(r). This implies:

$$N_d = N_c \times \frac{\sum_{p \in p(r)} f_p}{N_c} = \sum_{p \in p(r)} f_p$$

where $f_p$ is the fullness of page p in the range p(r). Since computing $f_p$ may require accessing the page p, computing $f_p$ may be an expensive operation. Thus a key objective may be to accurately estimate $N_d$ without having to access each page in p(r).

A key objective of accurately estimating $N_d$ without having to access each page in p(r) can be reached through the use of sampling. More particularly, $f_p$ can be computed for a uniform random sample of the pages in p(r). The results can then be scaled up to obtain an unbiased estimate of the true value $\Sigma_{p \in p(r)} f_p$. Thus, if $\hat{N}_d$ is an estimator of $N_d$, S can be a uniform random sample of n pages in p(r), and $\epsilon$ can be the standard error of the estimator, then:

$$\hat{N}_d = \frac{N_c}{n} \times \sum_{p \in s} f_p \quad \varepsilon = \frac{N_c \times D \sqrt{1 - \frac{n}{N_c}}}{\sqrt{n}},$$

where D is the standard deviation of $f_p$ values over all pages in p(r). Using a relatively small sampling fraction (such as 1%) can be adequate to yield accurate estimates of $N_d$. As such, the offset computation may be performed efficiently.

Range-level defragmentation module 110 may utilize any suitable algorithm(s) or other means to perform range-level defragmentation. As but one example, consider the following algorithm RANGEDEFRAG(R) which may be implemented in accordance with some embodiments:

---
Example Algorithm 1: RANGEDEFRAG(R)
---

RangeDefrag(r)
1. Estimate $N_d$ using uniform random sampling over pages in p(r), i.e., the prefix of r.
2. Traverse pages in r in logical order, and eliminate internal fragmentation by moving rows as needed. // compaction step
3. O = $N_d$ pages from the start of the B+Tree
4. For each page p in r in logical order
5.    If the page id of p is not already at offset O, swap p with the page currently at offset O
6.    Advance O to the next physical page in the B+Tree
7. Return

---

In operation, RANGEDEFRAG(R) can first compute the offset at which the range r will be placed. Note that step 2 is a compaction step, where the internal fragmentation for range r can be eliminated. Note also that steps 3-6 can eliminate external fragmentation for range r. It can be observed that the main overheads of this operation (as compared to a full index defragmentation operation) are likely incurred in step 1. In this regard, the other steps may be necessary even in full index defragmentation.

Benefit Analysis

Recall that benefit analysis module 114 can be configured to perform a benefit analysis for defragmenting an index and/or an index range(s) without actually having to defragment the index or index range(s). Such an analysis may thus be thought of as a "what if" type of analysis similar to the "what if" type of analysis described above with respect to estimating the impact (in terms of pages) of defragmenting index I. For example, consider a statement that would scan a particular index or index range if it were to be executed. A benefit analysis for the statement may be automatically performed in response to receiving the statement without executing the statement, and without defragmenting any part of index 108. In some embodiments, the benefit analysis can provide a quantified estimate of the impact, in terms of resources (e.g., number of I/O operations) for executing the statement, that defragmenting the particular index or index range would have.

As explained above, functionality to perform the benefit analysis can made be available to the user via an application program interface (API) or other type of tool. Furthermore, in some embodiments the results of the benefit analysis may be aggregated and stored in a table which can be made available to the user. Thus, the user may be provided with a tool in which they can compare, for a certain statement(s), individual indexes based on the potential impact that would result from defragmenting each individual index. In the event limited resources are available for defragmenting the indexes, the user may select a certain index(es) to defragment based at least in part on the comparison.

As a practical example, consider performing a benefit analysis in the context of FIG. 1 and in the context of resources being measured in numbers of I/O operations (i.e., I/Os). In operation, a first estimated number of I/Os for executing a statement over index 108 or index range(s) of index 108 can be computed. A second estimated number of I/Os for executing the statement over a defragmented version of index 108 or the index range(s) can also be computed. Note that the first and second estimated numbers can be computed without executing the statement and without defragmenting index 108 or the index range(s).

Once computed, the first and second estimated numbers can then be compared to derive the estimated impact of defragmenting index 108 or the index range(s). More particularly, the difference between the first estimated number and the second estimated number can be computed. The difference can thus represent a quantified estimate of the impact that would result from defragmenting index 108 or the index range(s). Note that the impact may be considered a positive benefit when the first estimated number is greater than the second estimated number.

To assist the reader in understanding performing benefit analyses, a detailed description of estimating the impact (e.g., benefit) of defragmenting a full index will first be described. Following this, a detailed description of estimating the impact of defragmenting a set of one or more index ranges will be described thereafter.

Estimating Impact of Defragmenting Full Index

The benefit of defragmenting a full index I, on which a query (or other type of statement) Q can be executed, can be denoted Benefit(Q,I). Benefit(Q,I) can be considered the reduction in the number of I/Os for Q in the event the entire I was to be defragmented. This can be expressed as:

Benefit($Q,I$)=NumIOs($Q,I$)−NumIOsPostDefrag($Q,I$)

where Benefit(Q,I) is the benefit, NumIOs(Q,I) is the number of I/Os required to execute Q over I, and NumIOsPostDefrag (Q,I) is the number of I/Os over the defragmented I. Assuming I has some fragmentation before being defragmented, NumIOs(Q,I) can be considered the number of I/Os required to execute Q over fragmented I. In some embodiments, NumIOs(Q,I) and NumIOsPostDefrag(Q,I) can each be computed efficiently (without actually defragmenting I or executing Q) in accordance with the following discussion.

Computing NumIOs(Q,I):

One key observation may be made: the sequence of page identifiers (id)s in a range r of I that would be scanned by Q (if executed) may be sufficient for computing NumIOs(Q,I) efficiently. This information can be found in the index pages of I. As such, accessing the sequence may not require the leaf pages to be accessed. Furthermore, since the ratio of index pages to leaf pages in a large index is typically very small, and the index pages of the index are usually memory resident, the sequence can be obtained efficiently.

As but one example of an algorithm that may be used to compute NumIOs(Q,I), consider the following algorithm $\text{N}_\text{UM}\text{IO}_\text{S}$(Q,I) which may be implemented in accordance with some embodiments:

| Example Algorithm 2: NUMIOS(Q, I) |
|---|
| NumIOs(Q, I) |
| 1.    Let r be the range of the index I scanned by query Q. |
| 2.    Let P be a lookahead buffer that maintains leaf page ids in sorted order, max M elements. |
| 3.    n = 0; |
| 4.    Do |
| 5.       Add page ids to P obtained by iterating over index pages of B+Tree in logical order until there are M page ids in P or last page id in range r is encountered. |
| 6.       Extract from P maximal sequence of contiguous page ids at the start of P; |
| 7.    n = n+ 1 |
| 8.    While(P is non empty) |
| 9.    Return n. |

$\text{N}_\text{UM}\text{IO}_\text{S}$(Q,I) can "simulate" the execution of the range scan without issuing the actual I/Os. Note that a lookahead buffer P of page ids can be maintained. P may allow for contiguous page ids (within P) to be identified, since such contiguous pages can be fetched using a single I/O, thereby optimizing access to disk. The size M of P can be set to a value which is an upper bound of the number of pages that the system will fetch in a single I/O.

In operation, $\text{N}_\text{UM}\text{IO}_\text{S}$(Q,I) can first traverse the index pages of I to identify the starting page identifier (ID) for r. Starting at this page ID, and traversing the index pages of I in logical order, P can be filled with page IDs in r. Contiguous page ID sequences can be identified in the sorted order of pages in P. Each time the contiguity is violated, it can be known that Q would have incurred an additional I/O, and the counter can be incremented appropriately. P can then replenished with page IDs so that it is filled again up to the maximum limit M.

Computing NumIOsPostDefrag(Q,I):

once an index I is defragmented (e.g., by using an index reorganizing operation such as described above), it can be assumed that I will not contain any ranges having internal fragmentation or external fragmentation. Thus, a main challenge in computing NumIOs(Q, Defrag(I)) can be to estimate the number of pages in range r of I after I has been defragmented. To accomplish this, the uniform random sampling technique described above with respect to range-level defragmentation (e.g., example algorithm 1: RangeDefrag(r)) may be utilized. In this case, this technique can be invoked on individual pages in r. Recall that the estimator thus obtained can be an unbiased estimator of the true number of pages in r after the index is defragmented. Since after the defragmentation operation the logical and physical order of pages in the B+ Tree of I are identical, page ids will be consecutive. Thus each I/O can read in the maximum (max) number of pages M.

As but one example of an algorithm that may be used to compute NumIOsPostDefrag(Q,I), consider the following algorithm NUMIOSPOSTDEFRAG(Q,I) which may be implemented in accordance with some embodiments:

---
Example Algorithm 3: NUMIOSPOSTDEFRAG(Q, I)
---
NumIOsPostDefrag(Q,I)
1. Let r be the range of the index I scanned by query Q.
2. Sample k % of the data pages in the logical range r and use fullness of sampled pages to estimate number of pages in r after it is defragmented (say N)
3. Let M = max number of pages read in a single I/O
4. n = N/M
5. Return n.
---

Note that example algorithms NUMIOS(Q,I) and/or NUMIOSPOSTDEFRAG(Q,I) are adaptable to reflect specific aspects of various range scans on various types of systems, and to accommodate additional parameters, such as parameters capturing transient effects (e.g., buffering on I/Os) for instance.

Estimating Impact of Defragmenting Index Range(S)

Figure 3:
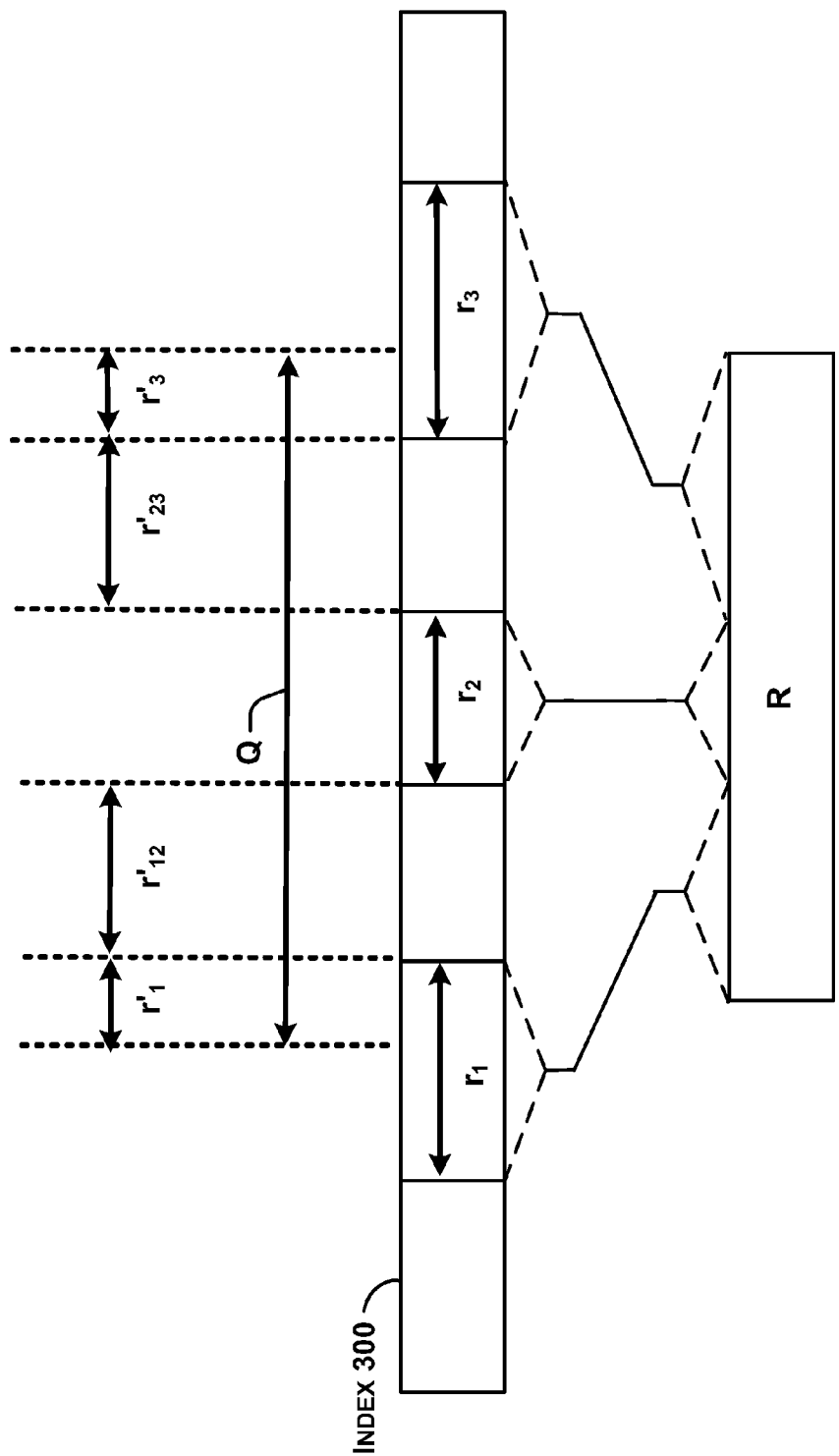

The benefit of defragmenting a set R of one or more non-overlapping ranges of index I, on which query (or other type of statement) Q can executed, can be denoted Benefit(Q,I,R). Benefit(Q,I,R) can be considered the reduction in the number of I/Os for Q if R was to be defragmented. To assist the reader in understanding the following detailed discussion with respect to computing Benefit(Q,I,R) efficiently (e.g., without actually defragmenting R or executing Q), FIG. 3 illustrates an example index 300.

As can be seen, index 300 includes an example set R of non-overlapping ranges ($r_1$, $r'_{12}$, $r_2$, $r'_{23}$, and $r_3$) on which query Q can be executed. The benefit Benefit(Q,I,R) of defragmenting R for Q can be expressed in the following example equation:

Benefit(Q, I, R) =      Example Equation 1
   Benefit($r'_1$, I) + Benefit($r_2$, I) + Benefit($r'_3$, I) +
   NumIOs($r'_{12}$, I) + NumIOs($r'_{23}$, I) −
   NumIOs($r'_{12}$, I, R) − NumIOs($r'_{23}$, I, R)

Note that for the ranges of Q that overlap with $r_1$, $r_2$, and $r_3$, namely $r'_1$, and $r'_3$ respectively, the number of I/Os (if R were to be defragmented) can be computed as though $r'_1$, and $r'_3$ correspond with three independent queries, and as though the entire index I was defragmented. However, consider the range $r'_{12}$ that is part of Q but that is not defragmented. Observe that although $r'_{12}$ is considered with respect to being defragmented, its layout can change if R were to be defragmented. This is because defragmenting a range (e.g. $r_1$) can require page swaps. Some page swaps may involve pages that belong to $r'_{12}$. Thus, the difference in the number of I/Os for this range after the set of ranges R is defragmented can equal:

NumIOs($r'_{12}$,I)−NumIOs($r'_{12}$,I,R).

There are potentially different approaches to modeling the impact of defragmenting a range r on the layout of another non-overlapping range r'. Below, two example modeling approaches are described, both of which may be modeled efficiently at low overhead. In general, in some embodiments the accuracy of such models can be increased by tracking the layout (i.e., the physical order in which pages are laid out in storage) more accurately.

Independence modeling approach: an independence modeling approach can assume independence across ranges, i.e. defragmenting r has no impact on the layout of r'. In this case, with respect to example equation 1 above:

NumIOs($r'_{12}$,I)−NumIOs($r'_{12}$,I,R)=0

NumIOs($r'_{23}$,I)−NumIOs($r'_{23}$,I,R)=0

Thus, the benefit Benefit(Q,I,R) of defragmenting R for Q can be modeled as the sum of the benefits for each of the ranges $r'_1$, $r_2$, and $r'_3$ Uniformity Modeling Approach:

a more general uniformity modeling approach can assume that the impact of defragmenting a range r uniformly impacts the layout of all other ranges r'. This approach implies that the larger the r', the greater the impact defragmenting r has on r'.

Furthermore, a conservative model can assume that the impact is adverse, i.e., the number of I/Os for r' will increase as a result of defragmenting r. The following formula is one example formula based on uniformity that assumes such a conservative approach:

NumIOs($r'$,I,{r})=NumIOs($r'$,I)=$N_{r'} \times EF(r)$, where $N_{r'}$ is the number of pages in r', N is the total number of pages in the index, and EF(r) is the measure of external fragmentation. More particularly, EF(r) can be considered the ratio of the number of fragments (non-contiguous leaf page sequences) in r to the total number of pages in r. To extend r to set of ranges R, contributions of each range in the set can be summed. Using the uniformity model, example equation 1 above can become:

$$\text{Benefit}(Q, I, R) = \text{Benefit}(r'_1, 1) + \text{Benefit}(r_2, I) + \text{Benefit}(r'_3, I) + \frac{(N_{r'_{12}} + N_{r'_{12}})}{N} \sum_{r \in R} EF(r)$$

Workload-Driven Recommendations

Figure 4:
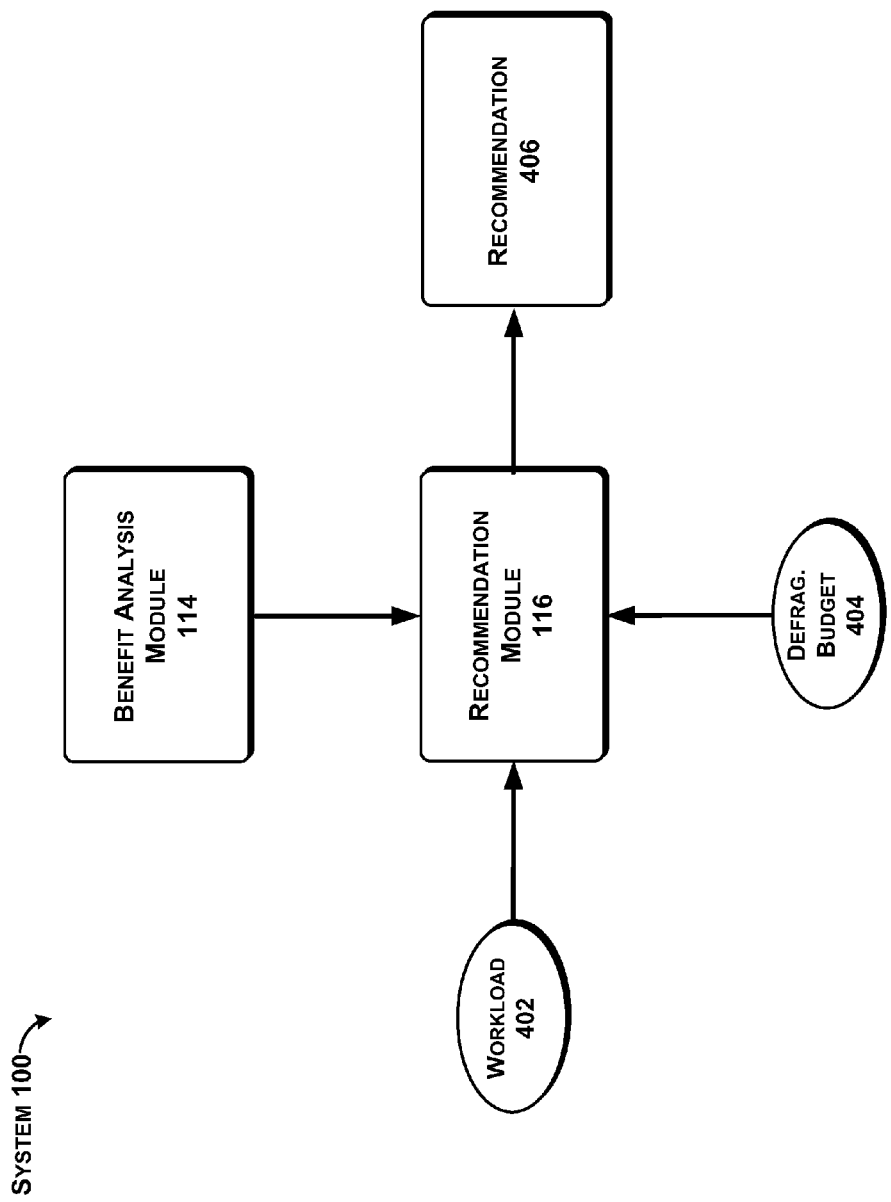
FIG. 4 illustrates an example system in which the described defragmentation techniques can be implemented, in accordance with some embodiments.

Recall that recommendation module 116 can be configured to automatically provide work load-driven recommendations of which index or index range(s) (if any) to defragment for a given workload and for a given defragmentation budget. To assist the reader in understanding the following detailed discussion regarding providing such recommendations, FIG. 4 illustrates recommendation module 116 of system 100 in further detail.

To automatically provide workload-driven recommendations, recommendation module 116 may leverage a benefit analysis performed by, for example, benefit analysis module 114. As such, in this example recommendation module 116 is shown as being configured to receive benefit analysis information from benefit analysis module 114. This may be accomplished, in some embodiments, via a benefit analysis API provided by benefit analysis module 114. However, this is not intended to be limiting since, as noted above, in some embodiments, recommendation module 116 and/or one or more other modules may be configured to perform all or part of the benefit analysis.

Here, recommendation module 116 is also shown as being configured to receive a workload 402 and defragmentation budget 404. Workload 402 can be defined by a set of statements and associated weights corresponding to each statement. This set of statements can be received from any suitable source, such as from a user, another module, or the like. The set of statements can include any number of individual statements, such as queries, update statements, or the like that may be executed over one or more indexes and/or index ranges of indexes 106. Each statement can be associated with a corresponding weight. Weights can be assigned or otherwise associated with their corresponding statements in any suitable way. In some embodiments, individual weights may represent statistical information associated with a corresponding statement, such as the frequency that the corresponding statement has been executed over indexes 106 (i.e., the corresponding statement's execution frequency).

Defragmentation budget 404, in turn, can be defined by I/O operation costs (e.g., I/O cost units) associated with defragmenting target index(es) or index range(s) that are to be scanned as a result of the workload being executed. The defragmentation budget can designate a resource limit, measured in I/O cost units, for defragmenting individual indexes and/or index ranges of the database. In other words, defragmentation budget 404 can designate the resources that are available for defragmenting the target index(es) or index range(s).

Based on workload 402 and defragmentation budget 404, recommendation module 116 can generate candidate indexes or index ranges (i.e. candidates) to potentially defragment. The candidates may include a set of target index(es) and/or index range(s) that would be scanned as a result of the workload's statements being executed. Optionally, the candidates may include other indexes and/or index ranges based on relevant database information.

Recommendation module 116 can then compute, and/or cause one or other modules to compute, an estimated benefit of defragmenting each candidate by performing benefit analyses for each candidate. More particularly, for each candidate, the impact of defragmenting the candidate can be estimated utilizing the benefit analysis techniques described in detail above. In some embodiments, recommendation module 116 may utilize the benefit analysis API of benefit analysis module 114 to perform benefit analyses.

Based at least on the given workload, given defragmentation budget, and/or each candidate's estimated benefit (collectively the estimated benefits), in some embodiments recommendation module 116 can select, from the candidates, a set of zero, one, or multiple recommended candidates (e.g., one or more recommended indexes or index ranges) to recommend for defragmentation. When the set of recommended candidates includes one or more recommended indexes or index ranges, the index(es) or index range(s) can then be defragmented without defragmenting all of the candidates. The selection can be based on identifying and choosing the candidate(s) estimated to provide an enhanced level of benefit from being defragmented. In some embodiments, this enhanced level may provide an optimal level of benefit.

In other words, since less than all of the candidates may be defragmented under the defragmentation budget, the candidat(es) that have a relatively high (e.g., potentially the highest) estimated benefit on the I/O performance, when defragmented, can be selected. In some embodiments, a greedy heuristic can be utilized to make the selection, or assist in making the selection. In some circumstances, the candidates may not be associated with a sufficient amount of benefit. In such circumstances, there might not be any candidates selected to recommend for defragmentation. In such cases, the set might include zero candidates.

The challenge of selecting a candidate(s) having a relatively high estimated benefit can be expressed as an index defragmenting problem. More particularly, consider a database with a set of indexes $S=\{I_1, \ldots, I_n\}$ and a workload $W=\{(Q_1,w_1), \ldots (Q_m,w_m)\}$, where each $Q_i$ is a query, and $w_i$ is the weight of query $Q_i$. For each index $I_j$, the cost of defragmenting $I_j$ is $ReorgCost(I_j)$. The benefit of defragmenting index $I_j$ on query $Q_i$ is $Benefit(Q_i,I_j)$. Given a defragmentation cost budget of B, find a subset $D \subset S$ to defragment such that:

$$\sum_{d \in D} \sum_{i=1}^{m} w_i \times \text{Benefit}(Q_i, d)$$

is maximized, subject to the constraint:

$$\sum_{d \in D} ReorgCost(d) \leq B$$

Note that the index defragmenting problem expression above is NP-Hard. Also note that the expression assumes that a full index is defragmented. However, the expression can be extended in a straightforward manner to accommodate for range-level index defragmentation scenarios.

Recommendation module 116 may utilize any suitable algorithm(s) or other means to automatically provide work load-driven recommendations. As but one example, consider the following algorithm which is configured to automatically select index range(s) (i.e., candidates) to defragment with respect to a query Q for a given workload W and for a given defragmentation budget B.

---

Example Algorithm 4: RECOMENDTODEFRAGMENT

RecommendToDefragment (W, B)
W is a workload, B is a defragmentation cost budget
1.     C = { } // Set of candidate indexes (ranges) to defragment
2.     // Identify candidates based on workload
3.     For each query Q in W
4.        For each range scan r in Q over an index
5.           C = C ∪ r // r is the range scanned in query Q
6.     // Identify additional candidates based on data
7.     For each index I referenced in workload
8.        Build equi-depth histogram on leading column of index
9.        For each bucket r in histogram that is accessed by workload
10.           C = C ∪ r // candidate based on data-only
11.     // Compute total benefit of each candidate index range
12.     For each range r in C (say r belongs to index I)
13.        For each query Q in W that references index I
14.           TotalBenefit(r) += wQBenefit(Q, I, {r}) // use "what-if" API
15.     // Greedy heuristic for Knapsack
16.     BudgetUsed = 0
17.     For each range r in C in descending order of TotalBenefit(r)/ReorgCost(r)
18.        If (budgetUsed + ReorgCost(r)) ≤ B)
19.           R = R ∪ r ; BudgetUsed += ReorgCost(r)
20.           Update benefit of ranges r'∈ C on same index as r // handle interactions
21.     Return R Regarding RECOMENDTODEFRAGMENT, note that steps 2-8 are responsible for candidate generation, i.e. identifying the space of index ranges to defragment. More particularly, steps 2-5 identify index ranges scanned by statements (e.g., queries) in workload W as candidates. Note that for purposes of illustration, RECOMENDTODEFRAGMENT is expressed in the context of a statement that is a query (Q). However, RECOMENDTODEFRAGMENT may also be adapted to accommodate other types of statements (e.g., update statements) as well.

Steps 6-10, in turn, introduce additional candidates at a finer granularity than those based on W alone. As an example, consider a statement that scans an entire index. In such a case, additional candidates can be introduced in steps 6-10. These additional candidates can be important since they can take advantage of range-level index defragmentation. Logical index ranges of approximately equal width are identified for the ranges accessed in the workload. In some embodiments, an equi-depth histogram may be used for identifying these index ranges. Note that approximate equi-depth histograms can be efficiently computed using a uniform random sample of pages of the index. Optionally (for efficiency purposes), in some embodiments candidates with a relatively low fragmentation (e.g., below a defined threshold) may be pruned.

In Steps 11-14, for each candidate, a total benefit for all statements in the W can be calculated (taking into account a weight of each statement). Note that step 14 calls the benefit analysis API (referred to in the comments on line 14 as the "what-if" API) to calculate the total benefit for each candidate. As such, this step leverages the benefit analysis. Steps 15-20, in turn, implement a greedy heuristic for a so called "Knapsack problem" to select/return R.

Note that step 20 of RECOMENDTODEFRAGMENT need not necessarily be invoked unless a modeling approach is taken that models interactions across index ranges within an index (e.g. the uniformity modeling approach described above). For example if the independence modeling approach were to be taken, then Step 20 would be skipped. A worst case running time of the algorithm in O(nm+m log(m)), which can be where n is the number of queries in the workload and m is the number of indexes.

Possible Recommendation Approaches

Note that the above algorithm RECOMENDTODEFRAGMENT is configured to automatically select index range(s) to defragment for W and B. This solution can be considered one of four possible approaches to making recommendations for index (es) or index range(s) to defragment. More particularly, in approaching the problem of deciding which indexes or index ranges in a database to defragment, two orthogonal considerations can be identified: (a) whether or not to leverage workload information, and (b) whether or not to allow range-level index defragmentation. Leveraging workload information can be important since it may be advantageous to pick indexes and/or index range(s) to defragment that have the most benefit on the I/O performance of the workload. Considering range-level index defragmentation is potentially important since fragmentation can be skewed across different logical ranges of an index. Thus, as explained in detail above, defragmenting a logical range can potentially provide significant benefit for queries while incurring a small fraction of the cost of fully defragmenting the index.

The following example table summarizes these four identified possible index defragmentation approaches:

| Example Table 1 | |
| --- | --- |
| Full Index Defragmentation, Workload Information not Utilized (FULL) | Range-Level Defragmentation, Workload Information not Utilized (RANGE) |
| Full Index Defragmentation, Workload Information Utilized (FULL-W) | Range-Level Defragmentation, Workload Information Utilized (RANGE-W) |

Note that in Table 1, the approach identified as RANGE-W utilizes range-level defragmentation and workload information to provide recommendations of an index range(es) to defragment. RANGE-W can be considered the most general of the four illustrated approaches and is the approach taken by the RECOMENDTODEFRAGMENT algorithm described above.

Another approach identified in table 1 is FULL-W. Note that FULL-W utilizes workload information but does not utilize range-level defragmentation. As such, entire indexes are recommended for defragmentation rather than individual index ranges. Note that in some embodiments RECOMENDTODEFRAGMENT may be modified to provide a FULL-W approach. More particularly, step 5 may be modified to add the full index I scanned in query Q rather than the range r. In addition, steps 6-10 may be omitted.

Another approach identified in Table 1 is RANGE. Note that RANGE utilizes range-level defragmentation but does not utilize workload information. Note also that in some embodiments, RECOMENDTODEFRAGMENT may be modified to provide a RANGE approach. More particularly, steps 2-5 may be omitted and steps 6-11 may be modified to introduce candidates for all indexes rather than for those referenced in the workload. Furthermore, steps 11-14 may be modified so that the TotalBenefit(r) for a candidate range is Benefit(r, I, {r}). In other words, the benefit can be obtained for a range scan on r itself and not for queries in a workload.

The final approach identified in Table 1 is FULL. Note that FULL does not utilize range-level defragmentation or workload information. Note also that in some embodiments, RECOMENDTODEFRAGMENT may be modified to provide a FULL approach. More particularly, the same modifications to provide the RANGE approach may also be made to provide the FULL approach. However, unlike the modifications to provide the RANGE approach, the introduction of candidates based on the histogram may be skipped and one candidate per index may be introduced.

Example Operating Environment

Figure 5:
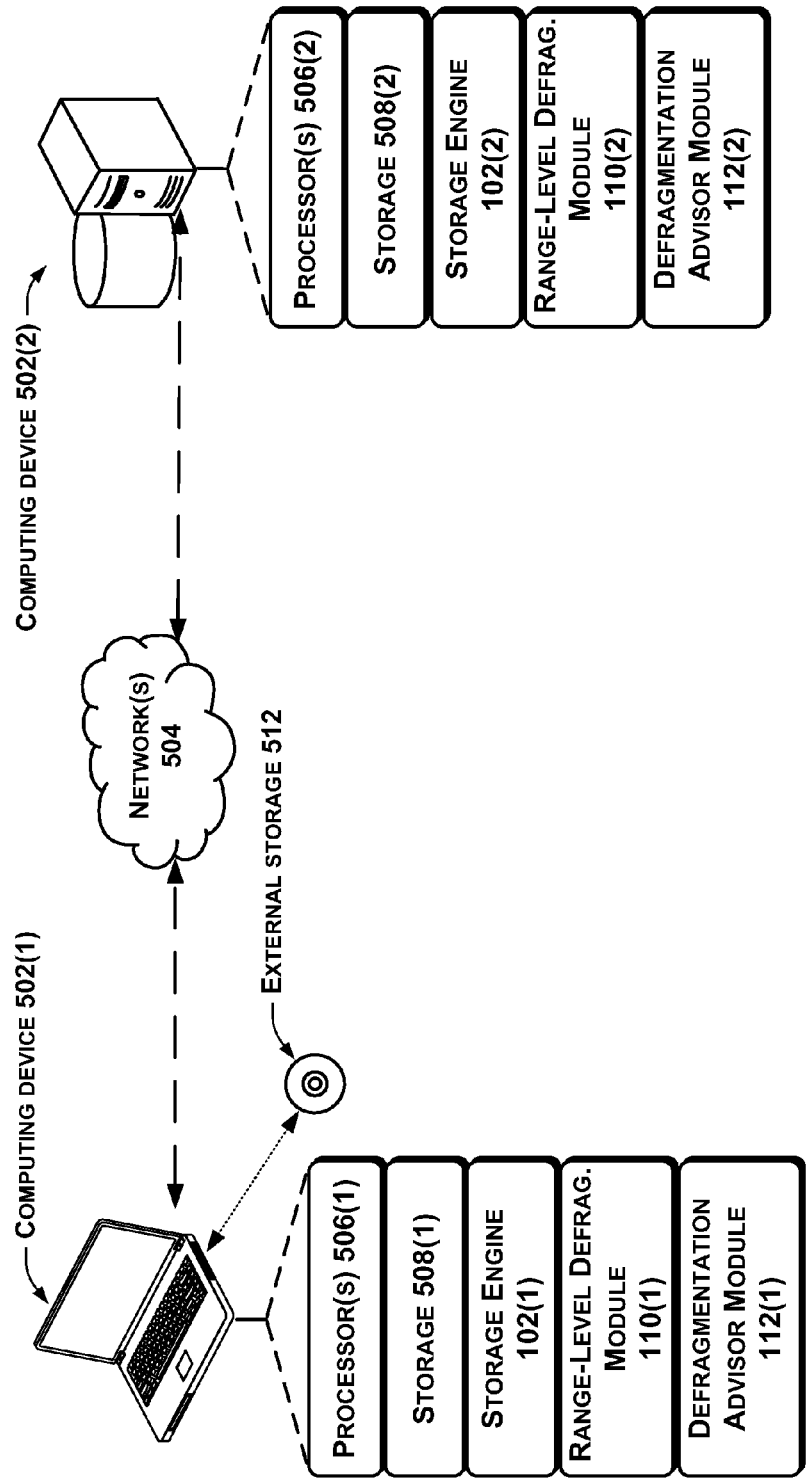
FIG. 5 illustrates an example operating environment, in accordance with some embodiments.

FIG. 5 illustrates an example operating environment 500 in which the described defragmentation techniques may be implemented, in accordance with some embodiments. For purposes of discussion, operating environment 500 is described in the context of system 100. As such, like numerals from FIG. 1 have been utilized to depict like components. However, it is to be appreciated and understood that this is but one example and is not to be interpreted as limiting system 100 to only being implemented in operating environment 500.

In this example, operating environment 500 includes first and second computing devices 502(1) and 502(2). These computing devices can function in a stand-alone or cooperative manner. Furthermore, in this example, computing devices 502(1) and 502(2) can exchange data over one or more networks 504. Without limitation, network(s) 504 can include one or more local area networks (LANs), wide area networks (WANs), the Internet, and the like.

Here, each of computing devices 502(1) and 502(2) can include a processor(s) 506 and storage 508. In addition, either or both of these computing devices can implement all or part of storage engine 102, range-level defragmentation module 110, and/or defragmentation advisor module 112. As noted above, storage engine 102 can be configured to receive and process statements and, in response, access database(s) 104 according to the statements. As such, either or both of computing devices 502(1) and 502(2) may be configured to receive such statements.

Processor(s) 506 can execute data in the form of computer-readable instructions to provide a functionality. Data, such as computer-readable instructions, can be stored on storage 508. The storage can include any one or more of volatile or non-volatile memory, hard drives, optical storage devices (e.g., CDs, DVDs etc.), among others.

Devices 502(1) and 502(2) can also be configured to receive and/or generate data in the form of computer-readable instructions from an external storage 512. Examples of external storage can include optical storage devices (e.g., CDs, DVDs etc.) and flash storage devices (e.g., memory sticks or memory cards), among others. The computing devices may also receive data in the form of computer-readable instructions over network(s) 504 that is then stored on the computing device for execution by its processor(s).

As mentioned above, either of computing devices 502(1) and 502(2) may function in a stand-alone configuration. For example, the storage engine, range-level defragmentation module, and defragmentation advisor module may be implemented on computing device 502(1) (and/or external storage 512). In such circumstances, the described defragmentation techniques may be implemented without communicating with network 504 and/or computing device 502(2).

In another scenario, one or both of the range-level defragmentation module or defragmentation advisor module may be implemented on computing device 502(1), while the storage engine (and possibly one of the above-mentioned modules) may be implemented on computing device 502(2). In such a case, communication between the computing devices might allow the described defragmentation techniques to be implemented.

In still another scenario computing device 502(1) might be a thin computing device with limited storage and/or processing resources. In such a case, processing and/or data storage could occur on computing device 502(2) (and/or upon a cloud of unknown computers connected to network(s) 504). Results of the processing can then be sent to and displayed upon computing device 502(1) for the user.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices.

Exemplary Methods

Figure 6:
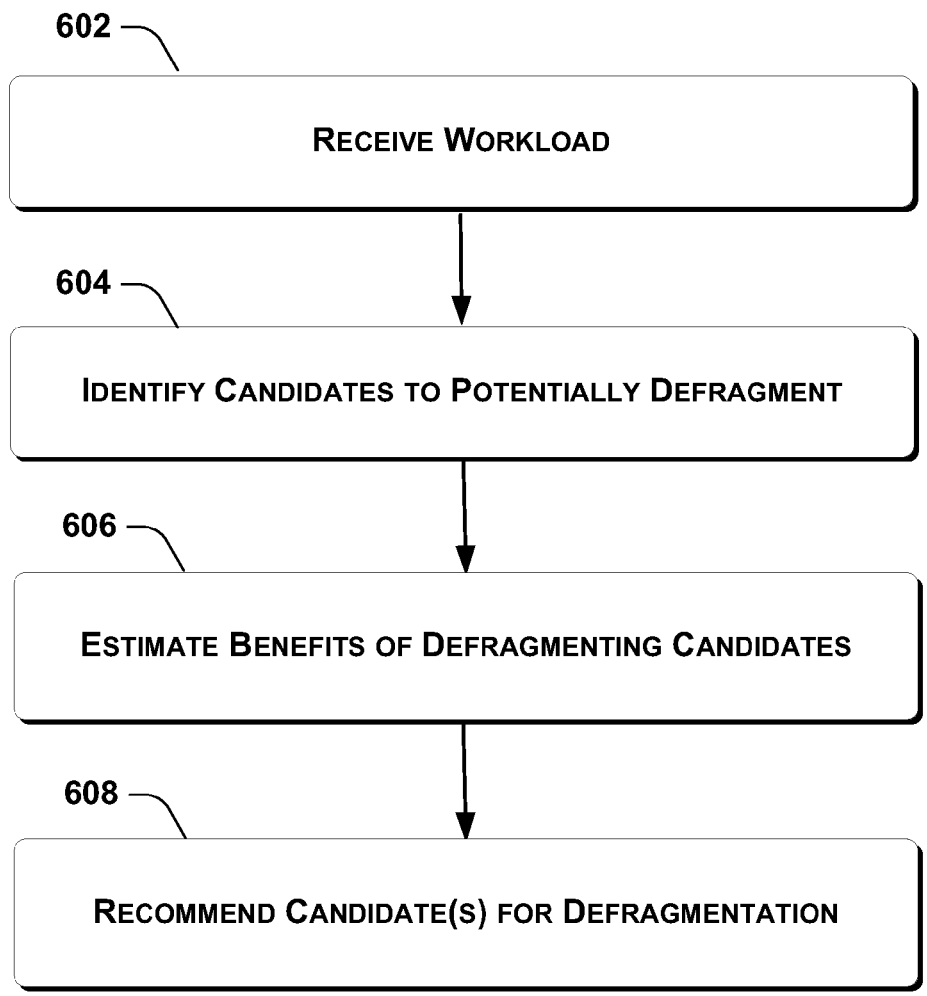
FIGS. 6 and 7 illustrate example methods, in accordance with some embodiments.
Figure 7:
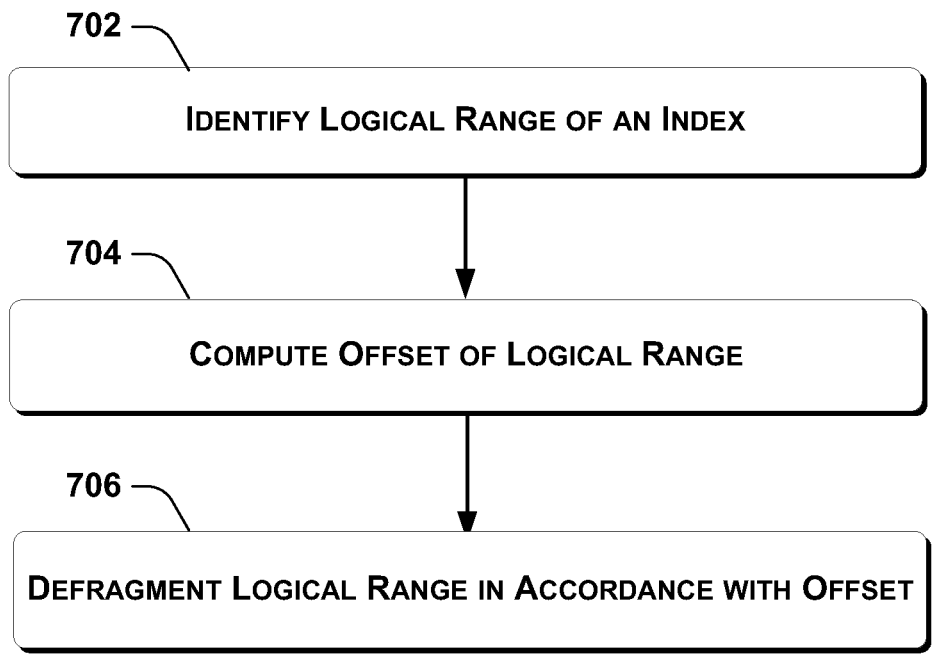

FIGS. 6 and 7 illustrate flowcharts of processes, techniques, or methods, generally denoted as method 600 and method 700 respectively, that are consistent with some implementations of the described defragmenting techniques. The orders in which methods 600 and 700 are described are not intended to be construed as a limitation, and any number of the described blocks in each of these methods can be combined in any order to implement the method, or an alternate method. Furthermore, each of these methods can be implemented in any suitable hardware, software, firmware, or combination thereof such that a computing device can implement the method. In some embodiments, one or both of these methods are stored on a computer-readable storage media as a set of instructions such that, when executed by a computing device(s), cause the computing device(s) to perform the method(s).

Regarding method 600 illustrated in FIG. 6, block 602 receives a workload. As explained above, the workload may include one or more statements that are executable over one or more target indexes and/or index ranges of a database. The workload can also include weights that correspond to each statement of the workload and represent statistical information about each statement (e.g., an execution frequency of each statement).

Block 604 indentifies candidates to potentially defragment. As explained above, in some embodiments the target index(es) or target index ranges that would be scanned, in the event the statement(s) were to be executed, can be identified as the candidates. Optionally, other candidates may also be identified based on data associated with fragmentation statistics, index and/or index range characteristics, etc.

Block 606 estimates benefits of defragmenting the identified candidates. In some embodiments, this can include performing a benefit analyses for each identified candidate to estimate the impact that defragmenting the index or index range(s) would have in the event the statement(s) were to be executed. As explained above, such analyses may be performed without defragmenting the index or index range(s) and without executing the statement(s). In some embodiments, algorithms such as $\text{NumIOs}(Q,I)$ and/or $\text{NumIOsPostDefrag}(Q,I)$ described above may be used to perform the analyses.

Block 608 recommends a set of recommended candidates for defragmentation. The set of recommended candidates can include any number of recommended candidates. As explained in detail above, this step can include selecting, form the identified candidates, the recommended candidate(s) based on a given defragmenting budget, the workload, and the benefits estimated at block 606. In some embodiments, an algorithm such as RECOMENDTODEFRAGMENT described above may be used to select the recommended candidates. As described above, when the set of recommended candidates includes at least one recommended candidate (selected from the identified candidates), that recommended candidate may be defragmented without defragmenting all of the identified candidates.

Regarding method 700 illustrated in FIG. 7, block 702 indentifies a logical range of an index. As explained above, the logical range might be expressly identified in a communication, identified as a range that would be scanned by an executed statement, or identified in some other manner.

At block 704, an offset for the logical range can then be computed. The offset can designate where a defragmented version of the logical range can be placed in the index. As explained above, in some embodiments computing the offset can include estimating the size (e.g., the number of pages) of a second logical range of the index in the event the entire index was to be defragmented. As also explained above, computing the offset can be accomplished without defragmenting the logical range or the second logical range.

At block 706, the logical range can be defragmented in accordance with the offset. As explained above, this can be accomplished without defragmenting the entire index. In some embodiments, an algorithm such as RANGEDEFRAG described above may be used to defragment the logical range.

CONCLUSION

Although techniques, methods, devices, systems, etc., pertaining to granular and workload driven database index defragmentation techniques are described in language specific to structural features and/or methodological acts, it is to be understood that the subject matter defined in the appended claims is not necessarily limited to the specific features or acts described. Rather, the specific features and acts are disclosed as exemplary forms for implementing the claimed methods, devices, systems, etc.

The invention claimed is:

1. A system comprising:
   a storage engine configured to process statements of a workload that are executable over an index or logical index range of a database, wherein different statements of the workload have different corresponding weights and the different corresponding weights reflect execution frequency of the different statements of the workload;
   a defragmentation advisor module configured to use the different corresponding weights to perform a benefit analysis that estimates an impact of defragmenting the index or logical index range; and
   at least one hardware processor configured to execute the storage engine and the defragmentation advisor module.

2. The system of claim 1, wherein the defragmentation advisor module is further configured to provide the benefit analysis via an application program interface (API).

3. The system of claim 1, wherein the defragmentation advisor module is further configured to:
   automatically monitor for a particular statement;
   responsive to detecting the particular statement, perform the benefit analysis; and
   store the estimated impact in an accessible location.

4. The system of claim 1, wherein, to estimate the impact, the defragmentation advisor module is further configured to:
   compute a first number of estimated resources for executing an individual statement of the workload over the index or logical index range;
   compute a second number of estimated resources for executing the individual statement over a defragmented version of the index or a defragmented version of the logical index range; and
   compare the first number of estimated resources and the second number of estimated resources to estimate the impact.

5. The system of claim 4, wherein the first number of estimated resources and the second number of estimated resources are measured in input/output operations associated with executing the individual statement.

6. The system of claim 1, wherein the defragmentation advisor module is further configured to:
   identify multiple candidate indexes or multiple candidate index ranges of the database;
   perform individual benefit analyses for the multiple candidate indexes or multiple candidate index ranges without defragmenting the multiple candidate indexes or multiple candidate index ranges; and
   recommend at least one of the multiple candidate indexes or multiple candidate index ranges for defragmentation based at least in part on the individual benefit analyses.

7. The system of claim 6, wherein the defragmentation advisor module is further configured to:
   perform the individual benefit analyses without executing any of the statements of the workload.

8. The system of claim 1, wherein the defragmentation advisor module is further configured to:
   determine the different corresponding weights for the different statements of the workload.

9. The system of claim 1, wherein the storage engine and the defragmentation advisor module comprise computer-readable instructions executed by the at least one hardware processor.

10. One or more hardware computer-readable memory devices or hardware storage devices having instructions stored thereon that, when executed by a computing device, cause the computing device to perform acts comprising:
    obtaining a query of a workload, the query having a query argument that limits a search of an index to a particular logical range identified by the query argument, wherein the index includes a prefix range that precedes the particular logical range in the index and both the prefix range and the particular logical range identified by the query argument are fragmented; and
    defragmenting the particular logical range identified by the query argument while leaving the prefix range of the index fragmented,
    wherein the defragmenting the particular logical range comprises removing one or both of: internal fragmentation from the particular logical range identified by the query argument or removing external fragmentation from the particular logical range identified by the query argument.

11. The one or more computer-readable hardware memory devices or hardware storage devices of claim 10, the acts further comprising:
    determining to defragment the particular logical range of the index without defragmenting other logical ranges of the index that are also identified by other query arguments of other queries, the determining being based on one or more of:
      an amount of fragmentation of the particular logical range relative to the other logical ranges, or
      a frequency of access of the particular logical range relative to the other logical ranges.

12. The one or more computer-readable hardware memory devices or hardware storage devices of claim 10, the acts further comprising:
    estimating a size of the prefix range of the index in the event the entire index was to be defragmented; and
    using the size of the prefix range as an offset where the particular logical range is placed when the defragmenting is performed.

13. The one or more computer-readable hardware memory devices or hardware storage devices of claim 12, wherein the estimating the size of the prefix range comprises utilizing a compaction ratio of pages before and after index defragmentation to estimate a number of pages of the prefix range in the event the entire index was to be defragmented.

14. The one or more computer-readable hardware memory devices or hardware storage devices of claim 13, wherein the estimating the number of pages of the prefix range is performed by sampling less than all of the pages of the prefix range.

15. The one or more computer-readable hardware memory devices or hardware storage devices of claim 10, the acts further comprising:
    determining to defragment the particular logical range identified by the query argument instead of other logical ranges identified by other query arguments by analyzing a cost associated with defragmenting the particular logical range as well as analyzing other costs associated with defragmenting the other logical ranges; and
    leaving the other logical ranges identified by the other query arguments fragmented when defragmenting the particular logical range.

16. The one or more computer-readable hardware memory devices or hardware storage devices of claim 10, the acts further comprising:
- determining to defragment the particular logical range identified by the query argument instead of other logical ranges identified by other query arguments by analyzing a benefit associated with defragmenting the particular logical range as well as analyzing other benefits associated with defragmenting the other logical ranges of the index; and
- leaving the other logical ranges identified by the other query arguments fragmented when defragmenting the particular logical range.

17. The one or more computer-readable hardware memory devices or hardware storage devices of claim 10, wherein the particular logical range identified by the query argument is defragmented without executing the query.

18. The one or more hardware computer-readable memory devices or hardware storage devices of claim 10, embodied in the computing device with one or more hardware processors of the computing device that execute the instructions.

19. A method performed by at least one computing device, the method comprising:
- obtaining a query of a workload, the query having a query argument that limits a search of an index to a particular logical range identified by the query argument, wherein the index includes a prefix range that precedes the particular logical range in the index and both the prefix range and the particular logical range identified by the query argument are fragmented; and
- defragmenting the particular logical range identified by the query argument while leaving the prefix range of the index fragmented,
- wherein the defragmenting the particular logical range comprises removing one or both of: internal fragmentation from the particular logical range identified by the query argument or removing external fragmentation from the particular logical range identified by the query argument.

20. The method of claim 19, wherein the defragmenting comprises removing the internal fragmentation from the particular logical range.

21. The method of claim 19, wherein the defragmenting comprises removing the external fragmentation from the particular logical range.

22. The method of claim 19, wherein the defragmenting the particular logical range comprises leaving a suffix range of the index fragmented.

* * * * *